(12) United States Patent
Siebert et al.

(10) Patent No.: US 6,199,276 B1
(45) Date of Patent: Mar. 13, 2001

(54) METHOD FOR REMOVING A DENSE CERAMIC THERMAL BARRIER COATING FROM A SURFACE

(75) Inventors: Timothy L. Siebert; Jeffery J. Reverman, both of Cincinnati; L. Timothy Rasch, Fairfield, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/371,817

(22) Filed: Aug. 11, 1999

(51) Int. Cl.$^7$ ...................................... B23P 15/00
(52) U.S. Cl. ........................ 29/889.1; 29/402.03
(58) Field of Search ............... 29/889.1, 402.01, 29/402.03, 402.06; 134/2, 3, 19; 156/344

(56) References Cited

U.S. PATENT DOCUMENTS

| | | | |
|---|---|---|---|
| 4,889,589 | 12/1989 | McComas | 156/646 |
| 5,167,721 | 12/1992 | McComas et al. | 134/32 |
| 5,254,413 | 10/1993 | Mariococchi | 428/633 |
| 5,614,054 | 3/1997 | Reeves et al. | 156/344 |
| 5,728,227 | 3/1998 | Reverman | 134/2 |
| 5,813,118 | 9/1998 | Roedl et al. | 29/889.1 |

*Primary Examiner*—I Cuda Rosenbaum
(74) *Attorney, Agent, or Firm*—Andrew C. Hess; Gerry S. Gressel

(57) ABSTRACT

A method is provided for removing a dense ceramic thermal barrier coating (TBC) from an article surface over which the TBC is disposed, the article surface including an edge at which at least a portion of an interface between the article surface and the TBC is exposed. The interface includes at least one material selected from Al, Ti, Cr, Zr and their oxides. The method comprises subjecting at least the exposed interface to a reducing gas at a temperature of at least 1600° F. to separate the TBC from the article surface. The reducing gas is subjected for a time sufficient for the gas to penetrate the interface at least by converting to a gaseous compound at least one material of the group at the interface, and for the TBC to be removed by separation from the article surface.

12 Claims, No Drawings

US 6,199,276 B1

METHOD FOR REMOVING A DENSE CERAMIC THERMAL BARRIER COATING FROM A SURFACE

BACKGROUND OF THE INVENTION

This invention relates to removal of a coating from an article surface, and, more particularly, to removal of a dense ceramic coating from an article surface which includes at least one of Al, Ti, Cr, Zr, and their oxides.

Gas turbine engine components, typically turbine section blades, vanes, nozzles and shrouds, are designed to operate at relatively high temperatures. During operation, such components experience strenuous environmental conditions, generally because the components are exposed at the high temperatures to a gaseous atmosphere of rapidly flowing air and products of turbine engine fuel combustion. Therefore, it has been a practice in the turbine engine art to enhance component operating life by applying various types of surface protective environmental resistant coatings or coating combinations to exposed surfaces of such components. Typical widely reported coatings on alloys that include Ti and/or Cr include metallic coatings frequently including Al, ceramic coatings some forms of which are called thermal barrier coatings, and their combinations.

During operation of such gas turbine engine articles, reaction to the thermal cycling of the engine or the impact of atmosphere borne particles or their combination has been observed to cause damage to the component. Repair of the damage frequently requires replacement of the surface protective coatings, that can have metal oxides at an interface between coatings or between coatings and the substrate. One commonly used type of environmental resistant coating is a metallic coating including the element Al, the coating including an inner portion diffused into a substrate or surface of the article. A description of forms of such coatings and a method for removal from a surface portion is included in U.S. Pat. No. 5,728,227—Reverman, (patented Mar. 17, 1998).

A form of the above mentioned high temperature ceramic protective coating frequently is called a thermal barrier coating (TBC) or TBC system. Examples have been reported in such U.S. Pat. No. as 4,055,705—Stecura et al. (patented Oct. 25, 1977); U.S. Pat. No. 4,095,003—Weatherly et al. (patented Jun. 13, 1978); U.S. Pat. No. 4,328,285—Siemers et al. (patented May 4, 1982); U.S. Pat. No. 5,216,808—Martus et al. (patented Jun. 8, 1993); and U.S. Pat. No. 5,236,745—Gupta et al. (patented Aug. 17, 1993). TBC frequently is applied over a metallic environmental coating to provide a TBC system. Removal of ceramic TBC presents a different kind of problem than removal of a metallic coating, particularly when the TBC is dense and substantially non-porous to chemicals intended to penetrate the surface of the coating. For example, it is a practice to deposit a substantially fully dense TBC using the commercially available chemical vapor deposition process. Application of an acidic solution to a TBC coating surface, to react chemically with and remove the ceramic, is time consuming and, more importantly, can enlarge the size of and change cooling air flow through air cooling openings, as discussed in the above identified Reverman patent.

Removal of TBC from an article surface has included exposure of the outer surface of the TBC to a halide intended to penetrate the outer surface and then attack the interface between the TBC and the substrate. Examples of such reported methods are included in U.S. Pat. No. 4,889,589—McCormas (patented Dec. 26, 1989) and U.S. Pat. No. 5,614,054—Reeves, et al. (patented Mar. 25, 1997). However, treatment of a dense TBC, particularly a substantially fully dense TBC, using known methods can be very time consuming and, therefore, costly.

BRIEF SUMMARY OF THE INVENTION

The present invention, in one form, provides a method for removing a dense ceramic thermal barrier coating (TBC) from an article surface over which the TBC is disposed. The article surface includes an edge at which at least a portion of an interface between the article surface and the TBC is exposed. The interface includes at least one material selected from Al, Ti, Cr, Zr and their oxides. The method comprises subjecting at least the exposed interface to a reducing gas at a temperature of at least 1600° F. for a time sufficient for the gas to penetrate the interface by converting to a gaseous compound at least one material of the group at the interface, and for TBC to be removed by separation from the article surface.

DETAILED DESCRIPTION OF THE INVENTION

Forms of gas turbine engine components to which the present invention has been applied include an air cooled turbine engine vane segment of the type described in U.S. Pat. No. 5,813,832—Rasch et al. (patented Sep. 29, 1998). Such an article includes at least one vane disposed between an inner and an outer band. In one embodiment, the vane was made of a Ni base superalloy, sometimes referred to as Rene' N4 alloy, nominally comprising, by weight, 9.8% Cr, 0.02% Zr, 7.5% Co, 4.2% Al, 3.5% Ti, 1.5% Mo, 6% W, 4.8% Ta, 0.15% Hf, with the balance Ni. In another form, the vane was made of a Co base alloy, sometimes referred to as X-40 alloy, nominally comprising, by weight, 10% Ni, 25% Cr, 2.5% W, 0.2% Fe, 2.5% Y, 0.05% C, with the balance Co. To protect some forms of the article from the strenuous high temperature operating conditions it is designed to experience, surfaces of such an article in the gas flow stream have included an outer ceramic TBC coating, frequently in combination with an inner metallic coating.

One form of a metallic coating, applied to and diffused with the article surface, includes Al. One example of such coating, sometimes called Code aluminide coating, is commercially available and is described, in one form, in U.S. Pat. No. 3,667,985—Levine ct al. (patented Jun. 6, 1972). Another widely reported and commercially used metallic protective coating is the M—Cr—Al—Y type of coating in which the "M" is Fe, Co, Ni, or their combinations. Another type of metallic protective coating is the Pt—Al coating which has been provided by electrodepositing Pt on a surface and then aluminiding that surface. For protection of the surface, elements of the coating, particularly Al, are diffused into the article surface for example by a heat treatment or heating during the application of the coating. When a surface including such a diffused coating requires repair and removal of the coating, the method of the above-identified Reverman patent has been used.

The ceramic TBC coating, as the outer coating portion of the combination, has been applied over the metallic aluminide type of coating, which then becomes the inner portion of the coating combination. One preferred method for depositing the ceramic TBC is by the commercial chemical vapor deposition because it provides a dense, and in some forms substantially fully dense, ceramic outer barrier. However, the dense nature of such TBC on an air-cooled article makes removal prior to repair difficult using known methods. Use of chemicals that can attack the article surface in areas at which ceramic coating is not present, for example in surface connected cooling air openings, can enlarge the openings and change design flow of cooling air.

The present invention utilizes an exposed interface between a TBC and an article surface, the interface including at least one material selected from Al, Ti, Cr, Zr, and their oxides. Frequently there is at the interface an inner metallic coating that includes Al. The TBC is removed by separating it from the underlying surface without damage to the article structure. For example when an article such as a gas turbine engine airfoil, band, strut, shroud, etc. has an outer layer of a TBC, the TBC generally terminates at an edge, such as a tip, of the article. This exposes an interface between the TBC and the underlying surface, frequently an inner metallic coating. Otherwise, an interface can be exposed such as by mechanical removal at an edge. During operation of an article at elevated temperatures under oxidizing conditions, a metal oxide of at least one of the elements Al, Ti, Cr and Zr, if present, can form at least at the interface. The presence of such elements and/or oxides at the interface is used in the present invention to remove the outer TBC from the article surface.

According to a form of the present invention, at least the exposed interface is subjected to a reducing gas comprising a halogen at a temperature of at least 1600° F. for a time sufficient for the halogen to penetrate the interface, converting at least one of the materials Al, Ti, Cr, Zr, and their oxides to a gaseous compound. In the above combination coating, Al and/or aluminum oxide is converted from the aluminide inner coating. For example, in the absence of an inner coating, the halogen can conver material from the article surface beneath the TBC. Conversion of such material to a gaseous compound, such as a halide, from the interface separates the outer TBC. Typically, the TBC separates and falls from the surface to which it had been applied.

As was discussed in the above-identified Reverman patent, a halogen such as in the form of a fluoride ion for removal of surface contaminants by conversion to a gaseous halide have been reported in such U.S. Pat. No. as 4,098, 450—Keller et al. (patented Jul. 4, 1978); and the Chasteen patents U.S. Pat. No. 4,188,237 and U.S. Pat. No. 4,405,379 (patented Feb. 12, 1980 and Sep. 20, 1983, respectively). Reverman recognized that exposure of diffused Al to a reducing fluoride gas, typically hydrogen fluoride gas, can draw or convert Al from the diffused portion without dimensional change by reacting the Al with the gas at a temperature of at least 1600° F. and for a time sufficient to deplete Al from that portion. Because a form of the present invention employs the subject matter from the Reverman patent, for convenience the disclosure of the Reverman patent U.S. Pat. No. 5, 728,227, from column 3, line 28 through column 4, line 22 hereby is incorporated herein by reference.

During evaluation of the present invention, a gas turbine engine air-cooled high pressure turbine nozzle, of a general type similar to that shown in the above-identified Rasch et al. patent and that had been operated in a gas turbine engine, was examined. The airfoil of the nozzle was made from the above identified Rene' N4 Ni base superalloy. It included a combination protective coating on its surfaces subject to the engine flow path. The combination coating included an inner diffused aluminide Codep coating, comprising a portion diffused into the Ni alloy surface, and a dense ceramic TBC comprising about 92 wt. % zirconia stabilized with about 8 wt. % yttria applied by chemical vapor deposition over the inner coating. It was observed that damage, such as cracking, had occurred to the airfoil of the nozzle and repair was required. Before repair could be initiated, however, it was deemed necessary to remove the combination coating from the surface of the airfoil and any oxides from within cracks.

Because the article had been operated in the flow path of the engine, the surface of at least the airfoil included oxides and other surface contaminants resulting from exposure to products of engine combustion, including oxides in the crack. In addition, the interface between the TBC and the inner coating included oxides at least of Al. The outer surface first was cleaned mechanically by ordinary grit blasting using 120 mesh aluminum oxide grit to remove the outer surface contaminants.

According to a form of the present invention, the ceramic outer TBC then was removed by exposing the airfoil in a furnace to a reducing halogen in the form of a mixture of about 6–14 wt. % hydrogen fluoride gas (in the range of about 6–20 wt. %) with the balance principally hydrogen gas for about 4 hours at about 1800° F., within the range of about 1600°–2000° F. This enabled the halogen to penetrate an exposed interface between the inner aluminide coating and the outer TBC from an exposed edge of the airfoil, converting at least Al and/or aluminum oxides from the inner surface to a gaseous aluminum fluoride compound and separating the TBC from the inner coating. Observation in the furnace after such treatment showed flakes and sheets of the TBC separated from the airfoil and lying beneath the treated article.

During separation of the TBC from the article surface, it has been observed that the reducing gas, entering at the interface, can deplete some of the aluminum from the inner coating as well. When additional Al depletion was desired, subsequent to TBC removal, an additional exposure to a reducing gas has been conducted, with and without an intermediate mechanical removal of the inner coating outer portion.

In the above specific example, after such removal of the TBC, the practice of the Reverman patent was conducted to remove the balance of the inner aluminide coating by first grit blasting the outer surface of the inner aluminide coating with a finer 240 mesh aluminum oxide. Then Al was depleted, along removal of oxides in the crack, from the remaining surface to provide an article surface in a condition for subsequent repair. This latter step was conducted in a furnace under the same conditions as the removal of the TBC. Observation of air cooling holes through the surface of the article showed substantially no change in dimensions.

Although a Ni base superalloy was evaluated in the above specific example, it should be understood that other substrate alloys, for example Co base alloys, have been treated in accordance with the present invention. For convenience, the present invention has been described in connection with specific examples, embodiments and combinations, including those in the incorporated portions of the Reverman patent. It will be understood by those skilled in the relevant art that this invention is capable of a variety of amplifications, modifications and variations without departing from its scope as defined by the appended claims.

What is claimed is:

1. In a method for removing a dense ceramic thermal barrier coating (TBC) from article surface over which the TBC is disposed, the article surface including an edge at which at least a portion of an interface between the article surface and the TBC is exposed, the interface including at least one material selected from the group consisting of Al, Ti, Cr, Zr and their oxides, comprising the step of:

subjecting at least the exposed interface to a reducing gas at a temperature of at least 1600° F. for a time sufficient for the gas to penetrate the interface by converting to a gaseous compound at least one material of the group at the interface, and for TBC to be removed by separation from the article surface.

2. The method of claim 1 in which:

the temperature is in the range of 1600°–2000° F.;

the time of subjecting the exposed interface to the reducing gas is 2–10 hours; and, the reducing gas is a mixture of 6–20 wt. % of a hydrohalogen gas, with the balance principally hydrogen gas.

3. The method of claim 1 in which the reducing gas is 6–14 wt. % hydrogen) fluoride gas, with the balance principally hydrogen gas.

4. The method of claim 1 for removing from the article surface a combination coating comprising (a) an inner coating which includes the element Al, the inner coating including a diffused inner coating portion in which at least Al is diffused into the article surface and an outer portion of the inner coating over the diffused inner portion, and (b) a dense TBC over the outer portion of the inner coating, comprising the additional step after removal of the TBC of:

subjecting the exposed diffused inner portion to a reducing gas comprising 6–20 wt. % halogen gas, with the balance principally hydrogen gas at a temperature of at least 1600° F. for a time of at least 2 hours sufficient for the halogen gas to deplete Al from the diffused inner coating portion substantially without dimensional change of the article surface.

5. The method of claim 4 in which, prior to subjecting the exposed diffused inner portion to the reducing gas, the step of:

mechanically removing the outer portion of the inner coating to expose the diffused inner coating portion.

6. The method of claim 4 in which:

the reducing gas is a mixture of 6–20 wt. % of a hydrohalogen gas, with the balance principally hydrogen gas;

the temperature is in the range of 1600°–2000° F.; and, the time of exposure is in the range of 2–10 hours.

7. The method of claim 6 in which the mixture is 6–14 wt. % hydrogen fluoride gas, with the balance principally hydrogen gas.

8. The method of claim 1 in which the article surface is a surface of a turbine engine component that has been operated in a turbine engine and surface contamination is on the TBC, comprising the step, prior to subjecting the interface to the reducing gas, of mechanically removing at least the surface contamination from the TBC.

9. The method of claim 8 for repairing the turbine engine component that has a crack that includes oxides therein, the article surface including a combination coating comprising (a) an inner coating which includes the element Al, the inner coating including a diffused inner coating portion in which at least Al is diffused into the article surface and an outer portion of the inner coating over the diffused inner portion, and (b) a dense TBC over the outer portion of the inner coating, comprising:

mechanically removing at least surface contamination from the TBC;

removing TBC from the outer portion of the inner coating by subjecting at least the exposed interface to a reducing gas comprising a mixture of 6–20 wt. % hydrohalogen gas, with the balance principally hydrogen gas for 2–10 hours at a temperature in the range of 1600°–2000° F. to enable the hydrohalogen to penetrate the interface by converting to a gaseous compound at least one material of the group at the interface, and for the TBC to be removed by separation from the article surface to expose the inner coating; and, subjecting the exposed inner coating and the crack to a reducing gas comprising 6–20 wt. % hydrohalogen gas, with the balance principally hydrogen gas for 2–10 hours at a temperature in the range of 1600°–2000° F. to deplete Al from the inner coating and oxides from the crack.

10. The method of claim 9 in which the reducing gas comprises 6–14 wt. % hydrohalogen gas with the balance principally hydrogen gas.

11. The method of claim 9 in which, prior to subjecting the exposed inner coating and the crack to the reducing gas, the step of:

mechanically removing the outer portion of the inner coating to expose the diffused inner coating portion.

12. The method of claim 9 in which the turbine engine component includes an airfoil including the combination coating.

* * * * *